Oct. 6, 1936.   W. J. WINNINGHOFF   2,056,637
METHOD OF AFFIXING FOREIGN SUBSTANCES TO A VITREOUS BODY
Original Filed Jan. 26, 1931
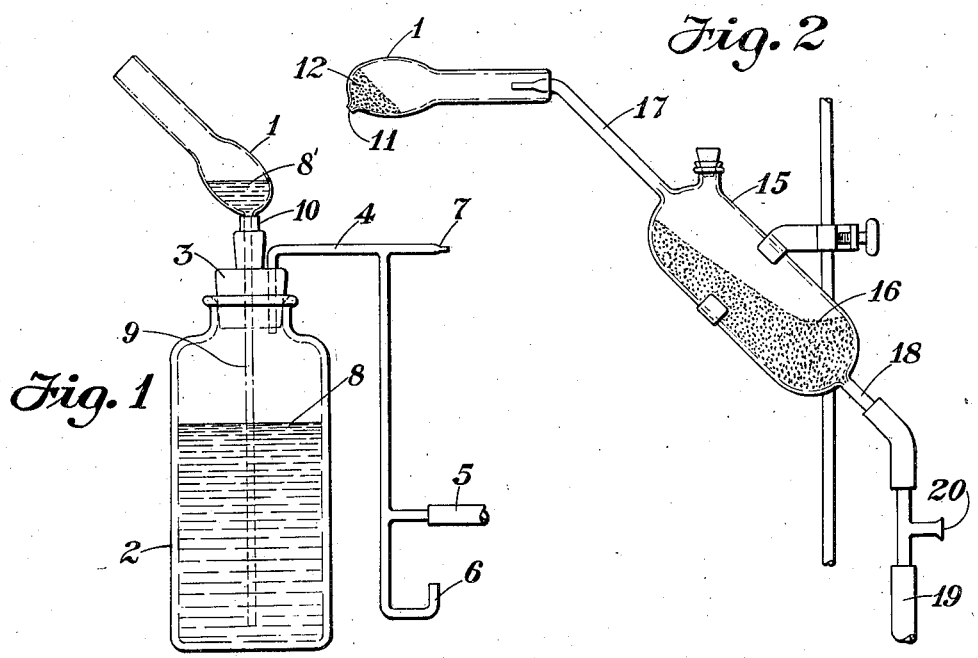
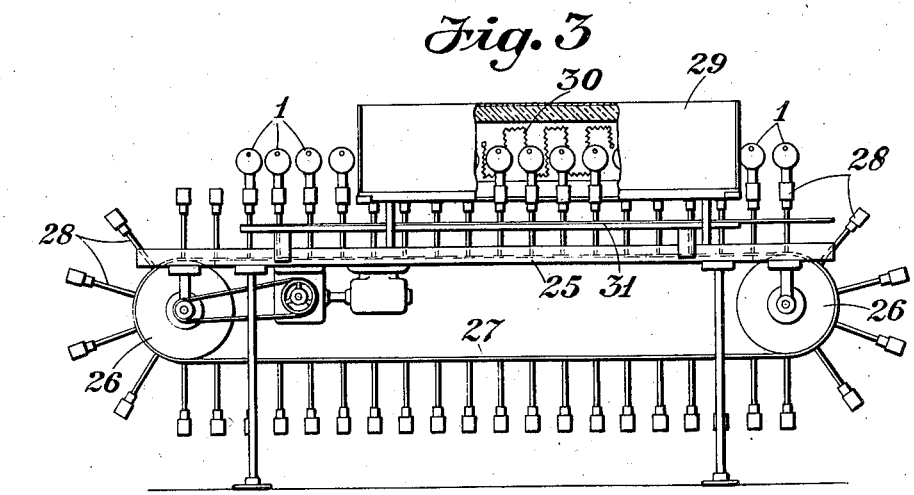
INVENTOR
Wilford J. Winninghoff
BY
ATTORNEY

Patented Oct. 6, 1936

2,056,637

UNITED STATES PATENT OFFICE 2,056,637

METHOD OF AFFIXING FOREIGN SUBSTANCES TO A VITREOUS BODY

Wilford J. Winninghoff, South Orange, N. J., assignor to General Electric Vapor Lamp Company, Hoboken, N. J., a corporation of New Jersey Application January 26, 1931, Serial No. 511,409
Renewed May 14, 1935

15 Claims. (Cl. 91—70)

The present invention relates to the manufacture of vitreous articles, and particularly to the affixing of a powdered or granular foreign substance to the walls of a vitreous body.

The invention consists in the new and novel method hereinafter set forth and claimed.

A particular object of the invention is to provide an improved method of producing a vitreous body having a powdered or granular substance affixed thereto. Other objects and advantages of the invention will appear from the following detailed specification or from an inspection of the accompanying drawing.

Considerable difficulty has been encountered in the past in the manufacture of various devices having a vitreous envelope to which a powdered or granular foreign substance is affixed. For example, in the manufacture of cathode ray oscillographs, the vitreous envelope of which must be coated on the inside with a fluorescent substance such as zinc sulphide, willemite, or the like, the various expedients heretofore employed to affix the fluorescent substance to the vitreous envelope have been long and tedious and at the same time unsatisfactory. Similar difficulties have likewise been encountered in the manufacture of mercury vapor arc devices, in which it is often desirable to have a granular substance, such as carborundum, affixed to the cathode bulb in contact with the meniscus of the mercury cathode, in order to facilitate the starting of the arc. In the latter case, the bulb has commonly been heated to such a temperature while the carborundum or the like was in contact therewith that the vitreous material partially fused and adhered to the carborundum. This method, while the best heretofore known, is obviously impracticable when the envelope is of fused silica, and even when the envelope is of glass it is not entirely satisfactory, since the working range between the temperature at which the carborundum will not adhere to the glass, due to insufficient fusing thereof, and the temperature at which the carborundum will sink so deeply into the glass as to weaken it physically and electrostatically, due to overheating thereof, is extremely small; so small, in fact, that both conditions frequently exist simultaneously in a single bulb having a considerable area exposed to a uniform source of heat, due to the variations in thermal capacity resulting from the variations in wall thickness commonly found in blown bulbs. Furthermore, the softening of the bulb required to affix the granular substance thereto tends to produce undesirable distortions in the bulb. The affixing of the granular substance to appreciable areas of the glass bulb has, therefore, been a serious problem. I have now found that the powdered or granular substances, such as used in the aforesaid or similar devices, may be very simply and satisfactorily affixed to a vitreous body by a new method of my invention. According to this new method a thin layer of a vitreous material having a materially lower softening or fusing temperature than that of said body is produced in a suitable manner on that portion of said body to which the foreign substance is to be affixed. The foreign substance is dusted on, partially embedded in, or intermixed with this layer of vitreous material, as desired, after which sufficient heat is applied to said body to frit the mass together. In case the material of lower melting point has substantially the same coefficient of expansion as said body it is, of course, obvious that this heating may be continued until complete fusion takes place if it is so desired. As a result of the lower temperature at which this process may be carried out, as compared to that necessary to fuse the foreign substance directly to the vitreous body, the distortion of the vitreous body which has been virtually inescapable with the process heretofore employed is completely eliminated.

For the purpose of illustrating my invention I have shown the apparatus which I preferably use to carry out the several steps of my new process in the accompanying drawing, in which Fig. 1 is an elevational view of the apparatus employed to produce a thin coating of a vitreous material having a relatively low melting point on the inner surface of a vitreous body.

Fig. 2 is an elevational view of the apparatus used to partially embed the foreign substance in said coating, and Fig. 3 is an elevational view, in part section, of the apparatus used to fuse or frit the vitreous coating to the vitreous body.

In the practice of my invention to affix carborundum to the interior surface of the cathode bulb 1 of a mercury arc lamp of the Cooper Hewitt type I first utilize the apparatus of Fig. 1 to coat the desired portion of the inner surface of said bulb with the glass of lower melting point. This apparatus consists of a bottle 2 having a suitable stopper 3 therein, through which passes a glass tube 4. Air under pressure is supplied to said tube 4 from any suitable source through the hose 5, a finger valve 6 which opens into said tube 4 normally affording free escape for said air. A restricted orifice 7 is also preferably connected to the tube 4, particularly when the pressure of said source is appreciable, in order to reduce the rate at which the pressure in said bottle 2 is increased when the finger valve 6 is closed. Said bottle is partially filled with a semi-fluid mixture 8 consisting of ethyl alcohol, or other readily volatilizable liquid, in which is suspended particles of a glass such as the French seal glass manufactured by Corning Glass Works, Corning, New York, U. S. A., and known to the trade as G858V. This glass, which consists of 55-60% PbO, 5-8% alkali (Na₂O or K₂O) and 33-37% SiO₂, has a fusing temperature materially below that of the lead glass ordinary used for the bulb 1, and at the same time has a coefficient of expansion which so closely approximates that of lead glass that it can be fused thereto. Said semi-fluid mixture 8 is conveniently prepared by grinding the French seal glass to an impalpable powder, such as will pass through a 200 mesh sieve, and then mixing the powder with ethyl alcohol in the proportions of say 500 grams of glass to 250 cubic centimeters of alcohol, the mixture being sufficiently agitated to produce a suspension of the glass particles in said alcohol. The ethyl alcohol employed must, of course, be denatured in order to comply with the requirements of the United States Government. Any approved denaturant which does not leave a residue which deleteriously affects the operation of the lamp or other device being manufactured may obviously be utilized for this purpose. A glass tube 9 which passes through the stopper 3 terminates at one end below the surface of the glass mixture 8, while the other end connects with a rubber connection 10, the resilience of which is utilized to provide a liquid tight connection with a bulb 1 when the latter is firmly held in place thereon, as shown, with the opening 11 in said bulb 1 in registry with the opening in said connection 10.

The apparatus of Fig. 2 has been found to be very convenient for introducing the carborundum or the like into the bulb 1. In this apparatus a glass container 15 contains a quantity of powdered or granular carborundum 16. The upper end of said container has a glass tube 17 extending therefrom, said tube being adapted to extend into the neck of a bulb 1, as shown. A glass tube 18 which extends from the lower end of said container 15 connects with a suitable source of air under pressure through the hose 19, a finger valve 20 normally affording substantially free escape of air from said hose, sufficient pressure being maintained in said hose 19, however, to prevent flow of the carborundum 16 thereinto.

The coating of powdered glass may obviously be fritted or fused to the bulb 1 in any suitable manner. I prefer, however, to use the apparatus of Fig. 3, which has been found to be very efficient and to cause a minimum of glass breakage. This apparatus has a channeled bed plate 25, from opposite ends of which the rollers 26 are suspended in such a manner that the endless belt conveyor 27 carried by said rollers 26 passes over the top of said bed plate 25, said belt being slowly moved by suitable propelling apparatus. Attached to said belt conveyor at spaced intervals are a series of work holding supports 28, in the upper end of which the tubular appendages of the bulbs 1 loosely fit. A suitably slotted oven 29 is mounted above said bed plate 1 in such a position that the bulbs 1 carried by said work holders 28 will pass therethrough as the conveyor 27 progresses. Said oven is conveniently heated by a resistance element 30 which is located near the center thereof, so that there is a temperature gradient from either end of said oven to a point adjacent to said heating element 30. Lateral support for the work holding supports 28 is provided by the guide members 31 which are mounted above the bed plate 25, and which extend longitudinally on either side of the path taken by said supports 28. Said guide members 31 likewise shield the belt conveyor 27 from the heat which escapes from the oven 29 through the opening in the bottom thereof.

In the use and operation of this apparatus I first place a bulb 1 of glass, quartz, or any suitable vitreous material, upon the rubber connection 10 with the opening 11, to which the negative inlead chamber is sealed at a later stage in the manufacture of the mercury vapor arc lamp of which the bulb 1 is a part, in registry with the opening in said connection. The finger valve 6 is then closed by the operator, causing the air pressure within the bottle 2 to increase, the glass mixture 8 being thereby forced upwardly through the tube 9 into the bulb 1 until a pool 8' of said mixture has been formed therein of desired depth. The pressure is then released by opening the finger valve 6, whereupon the glass mixture 8 descends by gravity into the bottle 2, leaving a coating 12 of powdered glass and alcohol of pasty consistency on the wall of the bulb 1. Any excess glass mixture is then allowed to drain from the bulb. While the aforesaid coating 12 of powdered glass is still moist the tubular portion of the bulb 1 is placed over the end of the glass tube 17, the opening 11 in said bulb being preferably closed, as for example, by the operator's finger. The finger valve 20 is then momentarily closed, forcing the compressed air upward through the mass of granular carborundum 16, some of this carborundum being carried with the air through said tube 17 into the bulb 1, where it adheres to the moist coating 12 of powdered glass, some of the granules even being partially embedded in said coating. The coating is then allowed to dry.

When thoroughly dry the coating 12 still adheres to the wall of the glass bulb 1 sufficiently to permit any ordinary handling of said bulb, although any undesired portions of said coating may be easily removed by brushing or rubbing. In practice it has been found desirable to remove the powdered glass and carborundum from the area immediately adjacent to the opening 11, to which the negative inlead chamber must be later sealed, since the presence of the carborundum and the powdered glass coating at this point tends to make it difficult to produce a perfect fusion of the parts. I also preferably remove enough of the coating 12 at one or more points which will be in contact with the mercury meniscus to divide the ring left around the opening 11, since the carborundum appears to be more effective when the line of contact thereof with said mercury meniscus is discontinuous.

The bulb 1 is then inserted in a work supporting member 28 which is being slowly carried toward the oven 29 by the belt conveyor 27. As said belt conveyor progresses the bulb 1 is carried within the oven 1, where it is gradually heated as it approaches the centrally located heating element 30, said oven being maintained at such a temperature that the French seal glass partially fuses as the bulb 1 passes said heating element. The carborundum and the French seal glass are thereby fritted together and to the glass of the bulb 1, with the result that the carborundum is firmly and permanently fixed to said bulb. Complete fusion of the French seal glass with the glass of the bulb 1 may be produced, if desired, although it has not been found necessary. After the bulb 1 has been carried past the heating element 30 the temperature thereof gradually falls, due to the temperature gradient in this portion of the oven, with the result that no cooling strains are created in the glass bulb 1. After emerging from the oven 29 the bulb 1 is allowed to cool a little longer, after which it is removed from the work holder 28. The bulb 1 is then ready to be fabricated into a mercury arc lamp.

While I have described a specific method of affixing the carborundum or other foreign substance to a vitreous surface, other methods are possible and are believed to be within the scope of the present invention. For example, in some cases the foreign substance may be mixed with the glass mixture 6, and applied to the vitreous surface therewith. This method has, in fact, proved of particular value when substances such as willemite are applied to the walls of a cathode ray oscillograph, since it ensures the even distribution of the substance over the vitreous surface. It is also useful where a powdered metal, such as aluminum, is to be affixed to a vitreous body, such as the envelope of a gaseous discharge device, particularly a mercury arc lamp. In another variation the glass of lower melting point may be produced by causing a chemical or physical change in the surface of the vitreous body to which the foreign substance is to be affixed. For instance, if a lead glass body be coated in a suitable manner with lead oxide and heat applied thereto, a surface coating of a glass richer in lead and having a lower melting point than that of the rest of the body will be produced. This coating may obviously be utilized to affix foreign substances to the lead glass body in the same manner as the powdered glass coating described in detail hereinbefore. It is to be understood, moreover, that various other changes, omissions or substitutions may be made in the several steps of the process by those skilled in the art without departing from the spirit of my invention.

I claim as my invention:

1. The method of affixing a powdered foreign substance to a vitreous body which comprises fritting said foreign substance to said body by means of a powdered vitreous material having substantially the same coefficient of expansion but a lower fusing temperature than that of said body.

2. The method of affixing a powdered foreign substance to a vitreous body which comprises mixing said foreign substance with a finely divided vitreous material having substantially the same coefficient of expansion but a lower fusing temperature than that of said body, coating the surface of said body with said mixture, and then heating said mixture only to a temperature sufficient to frit it to said body.

3. The method of affixing a powdered foreign substance to a vitreous body which comprises producing a coating on said body of a vitreous material having substantially the same coefficient of expansion but a lower fusing temperature than that of said body, dusting said foreign substance onto said coating, and heating said coating only to a temperature sufficient to partially fuse said coating.

4. The method of affixing a powdered foreign substance to a vitreous body which comprises producing a coating of a finely divided vitreous material having substantially the same coefficient of expansion but a lower fusing temperature than that of said vitreous body on that portion of said body to which the foreign substance is to be affixed, placing said foreign substance in contact with said coating and heating said coating only to a temperature sufficient to produce a partial fusion thereof whereby said foreign substance and said coating are fritted to said vitreous body.

5. The method of affixing a powdered foreign substance to a vitreous body which comprises suspending a quantity of powdered vitreous material having substantially the same coefficient of expansion but a lower fusing temperature than that of said body in a volatile liquid, applying the resulting mass over the surface to which said foreign substance is to be affixed, whereby a moist coating of said vitreous material is left on said vitreous body, dusting said foregin substance on said moist coating, and thereafter heating said coating only to a temperature sufficient to produce a partial fusion thereof whereby said foreign substance and said coating are fritted to said vitreous body.

6. The method of affixing a powdered foreign substance to a vitreous body which comprises grinding a quantity of a vitreous material having substantially the same coefficient of expansion as said vitreous body but a materially lower fusing point than that of said body to an impalpable powder, mixing said powder with a volatilizable liquid, applying said mixture over that portion of said body to which the foreign substance is to be affixed to produce a moist coating of said powder thereon, dusting said foreign substance onto said coating, and thereafter heating said coating to frit it to said vitreous body.

7. The method of affixing a powdered foreign substance to a vitreous body which comprises suspending a quantity of powdered vitreous material having substantially the same coefficient of expansion but a lower fusing temperature than that of said body in a volatile liquid, applying the resulting mass over the surface to which said foreign substance is to be affixed, whereby a moist coating of said vitreous material is produced on said body, dusting said foreign substance on said moist coating, allowing said coating to dry, removing any undesired portions of said coating, and thereafter heating said coating only to a temperature sufficient to frit said foreign substance and said coating to said vitreous body.

8. The method of affixing a foreign substance to a lead glass body which comprises coating a portion of said body with lead oxide, heating said body sufficiently to fuse said lead oxide into said body, whereby a film having a lower melting point than the remainder of said body is produced, coating said film with particles of said foreign substance, and applying sufficient heat to partially fuse said particles to said film.

9. In combination, a vitreous body, a coating of a vitreous material on the surface of said body, said material having a lower fusing temperature than said body and a coating of a foreign substance fritted to the surface of said coating of vitreous material.

10. In combination, a vitreous body, a coating of a vitreous material on the surface of said body, said material having a lower fusing temperature than said body, and a coating of a nonvitreous substance fritted to the surface of said coating of vitreous material.

11. A bulb of vitreous material, a coating on the interior surface of said bulb of another vitreous material having a lower fusing point than said bulb, and a coating of a granular material fritted to the surface of said coating of vitreous material.

12. In combination, a vitreous body, a coating of a vitreous material on the surface of said body, said material having a lower fusing temperature than said body and a coating of carborundum fritted to the surface of said coating of vitreous material.

13. In combination, a vitreous body, a coating of a vitreous material on the surface of said body, said material having a lower fusing temperature than said body and a coating of a fluorescent material fritted to the surface of said coating of vitreous material.

14. An electric discharge device comprising a sealed envelope having electrodes sealed therein for supporting an electric discharge in said device, a coating of a vitreous material on the inner surface of said envelope, said material having a lower fusing temperature than said envelope, and an exposed layer of fluorescent material fritted to the surface of said coating.

15. An electric gaseous discharge device comprising a sealed envelope having electrodes sealed therein, a gaseous atmosphere within said device, a coating of a vitreous material on the inner surface of said envelope, said material having a lower fusing temperature than said envelope, and an exposed layer of fluorescent material fritted to the surface of said coating.

WILFORD J. WINNINGHOFF.